United States Patent [19]

Campbell, Jr.

[11] 4,228,826
[45] Oct. 21, 1980

[54] INTERLOCKING, LAMINATED REFRACTORY FOR COVERING A PIPE

[76] Inventor: Frank Campbell, Jr., 2274 Broadlawn Dr., Houston, Harris County, Tex. 77058

[21] Appl. No.: 950,633

[22] Filed: Oct. 12, 1978

[51] Int. Cl.$^3$ ............................ F27D 9/00; F27D 3/02
[52] U.S. Cl. ................................. 138/149; 138/155; 138/177; 432/234; 264/512
[58] Field of Search .............. 138/140, 149, 155, 137, 138/156, 157, 169, 172, 174, 175, 177, 178; 264/512; 432/233, 234; 428/36

[56] References Cited

U.S. PATENT DOCUMENTS

| | | | |
|---|---|---|---|
| 1,731,991 | 10/1929 | Tracy | 138/175 X |
| 2,693,352 | 11/1954 | Bloom | 432/234 |
| 2,884,879 | 5/1959 | Corriston | 432/234 X |
| 3,053,715 | 9/1962 | Labino | 138/149 X |
| 3,055,651 | 9/1962 | McCullough | 432/234 |
| 3,151,633 | 10/1964 | Shuman | 138/149 X |
| 3,451,661 | 6/1969 | Barker | 138/149 X |
| 3,486,533 | 12/1969 | Doherty et al. | 138/149 X |
| 3,488,040 | 1/1970 | Dickson | 138/155 |
| 3,561,494 | 2/1971 | Hackett | 138/177 |
| 3,572,662 | 3/1971 | Weaver et al. | 432/234 |
| 3,706,448 | 12/1972 | Salter et al. | 432/234 |
| 3,914,100 | 10/1975 | Guskea | 432/233 X |
| 3,941,160 | 3/1976 | Campbell | 138/149 X |
| 3,986,528 | 10/1976 | Green | 138/177 |
| 4,015,636 | 4/1977 | Fossen | 138/149 |
| 4,063,573 | 12/1977 | Harting et al. | 138/155 |
| 4,071,311 | 1/1978 | Errington | 138/149 X |
| 4,095,937 | 6/1978 | Colburn et al. | 138/149 X |

FOREIGN PATENT DOCUMENTS

1318352 5/1973 United Kingdom .
1342891 1/1974 United Kingdom ..................... 432/234

*Primary Examiner*—James E. Bryant, III
*Attorney, Agent, or Firm*—Fulbright & Jaworski

[57] ABSTRACT

A two-piece, interlocking laminated refractory for covering a waterpipe and method of manufacturing same having a low thermally conductive inner ceramic fiber layer, an outer ceramic fiber layer which is less thermally conductive than the inner layer and a metal mesh reinforcement secured to and disposed between the inner and outer layers. The refractory shape includes two main segments, each having a body segment, two protuberances spaced apart from the body segment by corresponding recesses and a void between the two protuberances. The two segments are fitted together such that the body segment and pair of protuberances of one segment are closely received and interlocked with the void and the pair of recesses on the opposing main segment. The inner and outer layers of the refractory are vacuum-formed by the use of a perforated vacuum mold submerged in a first and second ceramic fiber slurry.

3 Claims, 7 Drawing Figures

INTERLOCKING, LAMINATED REFRACTORY FOR COVERING A PIPE

BACKGROUND OF THE INVENTION

In furnaces used throughout the metallurgical and related industries to heat a slab, billet, bloom or other raw steel shape, a typical furnace includes a complex network of vertical and horizontal water-cooled pipes which support an additional network of horizontal water-cooled skid rails along which slabs, billets, blooms, or other raw steel shapes are pushed or walked through the furnace. The metallurgical furnace is an open system; that is, heat which is transferred to the metal pipe network is conducted by the flowing water in the pipes to a point outside the furnace and is not recoverable. Accordingly, vast amounts of heat losses occur and correspondingly unnecessary amounts of energy are expended to replace the heat loss as a result of the heat transfer into the water-cooled pipe network. For example, as much as thirty to thirty-five percent of the total heat supplied to a metallurgical furnace by combustion of fuels is lost in an infrastructure of uninsulated skid pipes and the supporting pipe network. For a 4½ inch OD uninsulated water-cooled pipe in a furnace operating at 2400°–2500° F., the heat loss is approximately 115,000–120,000 Btu per lineal foot per hour. For a furnace having 200 feet of skid pipe, 200 feet of horizontal support and 200 feet of vertical support pipe, the heat loss is thus approximately 600×117,500 Btu/hour or 70,500,000 Btu per hour. Hence, the more effective the insulator or refractory around the pipe network, the more efficient and the more economical is the furnace to operate.

To date, various types of refractory materials have been utilized in order to reduce the amount of heat loss from the furnace through the water-cooled pipe infrastructure. The use of pre-fired or chemically bonded refractory materials which are welded, studded, wired, clipped or anchored with interlocking anchor straps is well known. Moreover, refractory concretes have even been formed in place around the pipe surfaces which are supported by any number and type of metallic anchors welded to the pipe surface. Almost without exception these forms of insulation have failed within a relatively short period of operation because of the inherent friability and susceptibility to fracture of the heavy, brittle fired ceramic refractory materials. As the metallic shape is moved along the metal skid rail, significant vibration and flexion of the water-cooled pipe infrastructure occur which are in turn transmitted into the friable, dense, rigid ceramic insulators. High temperature ceramic fiber blankets in the form of split rings, modules or simple wrappings have also been utilized as a means of insulating the pipe infrastructure. The use of ordinary high temperature ceramic fibers and ceramic fiber blankets as insulators around the water-cooled pipe has proven unsatisfactory for a number of reasons: first, the ordinary high temperature ceramic fiber blanket is susceptible to chemical reaction with scale and slag which is produced during the furnace operation; second, ordinary ceramic fiber blankets are inherently susceptible to erosion by the velocities of the gases within the furnace; and third, the ceramic fiber blankets have been difficult to attach to the pipe and suffer a notable shrinkage due to the high temperatures of the furnace.

Covering the ceramic fiber blanket with a rigid preburned ceramic tile refractory has proven less than desirable. Fractures in the refractory and the failure to form an intimate fit among the refractory segments has in effect exposed the ceramic fiber blanket underneath to the deleterious effects of the furnace noted above. Furthermore, the high specific weight of the preburned ceramic tile refractory has compressed the blanket underneath and has further chafed holes in the blanket from the movement of the tile on the blanket as the pipe is vibrated and flexed during furnace operations.

STATEMENT OF THE PRIOR ART

The following statement of the prior art is filed pursuant to 37 C.F.R. 1.97 and 1.98 and represents the closest prior art of which the applicant is aware. In accordance with 37 C.F.R. 1.98(b), photocopies of the patents mentioned below are appended hereto.

| U.S. Pat. No. | Name |
| --- | --- |
| 3,941,160 | Campbell |
| 3,451,661 | Barker |
| 4,015,636 | Van Fossen |

The device in the '160 patent relates to a dense, preburned ceramic refractory formed in interlocking shapes which are positioned by a number of studs 35 welded to the pipe which are received by the arcuate recesses 17 and the refractory shape. A ceramic blanket is positioned between the water pipe and the preburned ceramic tile. The device in the '160 patent weighs approximately 35 to 40 pounds per lineal foot and is rather rigid. Hence, vibrations in the furnace are transmitted to the preburned ceramic tile and frequently induce fracture along the interlocking portions. The massive weight of the preburned ceramic tile also induces the fracture of the studs which support the refractory. In both cases, the great weight of the refractory on the ceramic blanket underneath in combination with furnace vibrations compresses the blanket, chafes holes within the blanket and generally reduces the thermal barrier characteristics of the blanket. The inventor of the '160 device, who is also the applicant herein, has discovered that because of the weight of the preburned ceramic tile, the length of the refractory is limited to relatively short elements as is the length of its interlocking portion. Thus, the interlocking characteristics of the segments is less than desirable and sufficient seams occur along the fitted pieces which allow high velocity, high temperature gases and slag to pass through and to attack and destroy the blanket underneath.

The device in the '661 patent involves an interlocking outer refractory layer unsupported by studs welded to the pipe. The amount of time and effort expended in interlocking the numerous outer pieces is significant as is the number of seams defined by the individual pieces.

The '636 device again uses a preburned ceramic tile material having an inner layer of semi-cylindrical tiles held together on the pipe by a "C"-shaped ceramic refractory collar which is slid over the split tiles as they are held together. Again, the effort and time expended in insulating the pipe is less than satisfactory. The rigidity and weight of the device is less than desirable in terms of transmission of vibrations, and flexion of the pipe to the refractory which causes fracture of the refractory and deformation and wear of the insulating blanket underneath the tiles.

SUMMARY OF THE PRESENT INVENTION

The present invention relates to an interlocking laminated refractory covering for a water-cooled pipe and a method for manufacturing same. The refractory covering in its commercial form includes two main segments. Each main segment further includes a partial cylindrical wall which is termed a body segment for purposes of this application, and a pair of protuberances which are angularly spaced apart from the body segment by a corresponding pair of recesses. The body segment, protuberances and corresponding recesses of each main segment all lie in the same cylindrical surface of revolution so that the two main segments can be fitted together around a pipe to form an interlocking, cylindrical refractory shape which effectively insulates the water-cooled pipe inside the furnace. A series of interlocking main segments are fitted together in order to insulate an entire pipe.

The refractory shape is made from light-weight ceramic fibers which are highly resistant to heat flow. The ceramic fiber refractory is much lighter in weight and is less brittle than the conventional preburned ceramic tiles and allows each pair of interlocking main segments to be longer longitudinally and to have a greater interlock surface area than previous interlocking cylindrical shapes made of preburned ceramic tiles. Hence, a more intimate fit is obtained which reduces the deleterious effects of high temperature convection and slag migration through the seams of the refractory which quickly destroy the effectiveness of a ceramic blanket located between the water-cooled pipe and the refractory shape.

An even more intimate fit can be obtained by tapering the protuberances and the corresponding recesses so that the more the main segments are urged together, the more intimate is the fit between the segments.

The present invention includes a laminated ceramic fiber construction having an inner ceramic fiber layer, an outer ceramic fiber layer and a metal or ceramic fibric mesh reinforcement disposed between the inner and outer ceramic fiber layers. For reasons of economy, the inner ceramic fiber layer is less resistant to attack by furnace gases and corrosive slags and is less expensive to manufacture than the outer ceramic fiber layer which must withstand significantly higher temperatures and exposure to corrosive furnace slags and furnace gases. The outer ceramic fiber layer, when subjected to furnace temperatures in the 2600° F. range, generally permits the wire mesh reinforcement to function in a temperature range which will insure sufficient strength of the metal mesh which in turn assists the supporting of the entire refractory shape. The inner ceramic fiber layer further reduces heat flow from the furnace to the water-cooled pipe. Although a separate inner ceramic fiber blanket positioned between the outer laminated ceramic fiber construction and the water-cooled pipe is not necessary to the present invention, it is preferred in order to reduce even further the heat flow from the furnace to the water-cooled pipe and to act as a damper of vibrations and flexion in the pipe network which historically have shortened the effective life of a refractory covering.

The use of a light-weight, laminated ceramic fiber refractory reduces the crushing forces on the inner ceramic fiber blanket which historically have resulted from the massive weight of the preburned ceramic tiles. The reduction of the crushing forces, which forces compact and chafe the inner ceramic fiber blanket, extends both the useful life and the thermal effectiveness of the fiber blanket. Moreover, the coefficient of thermal conductivity of ceramic fiber is significantly lower than the prefired ceramic tiles presently in use. Hence, the resulting insulator is significantly more effective than present refractories in use with metallurgical furnaces.

The manufacture of the laminated refractory shape utilizes a perforated mold whose perforations are in communication with a vacuum source. A slurry from which the inner layer is formed can be maintained at room temperature. The inner layer slurry includes a mixture of conventional basic fiber bulk material, a binder including a colloidal silica or colloidal alumina, a starch and a quantity of water. As the perforated vacuum mold is inserted into the slurry for the inner layer, the colloidal silica, a relatively small portion of starch bond system and a majority of the water are drawn through the perforations while the ceramic fibers tend to form a bonded mat around the perforated mold. When the desired thickness of the inner layer is achieved, the perforated mold is removed from the slurry, the wire mesh reinforcement is superimposed around the inner layer shape and the combination is then inserted into a second slurry for the formation of the outer ceramic fiber layer. The outer ceramic fiber slurry mixture may consist of the same or similar thermal resistant ceramic fibers but in a ratio which utilizes a greater amount of higher temperature, slag, and furnace gas resistant fibers than the slurry used in the manufacture of the inner layer. The exact ratio of the various fibers will depend upon the furnace temperatures encountered, the desired thickness of the refractory shape and is further affected by considerations of economy; that is, higher temperature and slag resistant low thermally conductive fibers are more expensive than fibers having lower temperature and slag resistance with similar low thermally conductivity.

When the outer layer is formed to the desired thickness, the entire combination is removed from the second slurry, the perforated mold is removed from the refractory shape, the refractory shape is preferably placed upon a mandrel to maintain the shape of the refractory as it is cured in an oven and any necessary machining and cutting is performed in order to produce a substantially cylindrical shape. The cylindrical shape can then be cut to produce two main segments which are interlocking. The energy required to cure the vacuum-formed, ceramic fiber refractory is significantly less than the energy requirement to cure conventional preburned ceramic tile shapes. The resulting new refractory shape eliminates the need for the welding of metal studs to the pipe in order to anchor the refractory and the need to cement or band conventional semi-circular insulators presently used on water-cooled pipes. Hence, the labor expended on the installation of the refractory as described and claimed herein is remarkably reduced.

Another form of manufacture of the present invention replaces the laminated structure with a continuous spectrum of vacuum-formed, ceramic fiber material having varying characteristics of thermal conductivity which produce a substantially similar ceramic fiber refractory as the laminated construction. Such a construction can be obtained by rotating a cylindrical mold at high speeds so that the more dense, thermally resistant fiber materials migrate toward the outer portions of the refractory shape while the lighter, less thermally conductive fibers remain at the inner portions of the shape. Similarly, a mold can be rotated while a more expensive, low thermally conductive material is applied to the mold as the content of the material being applied is altered to include an increasing amount of a less expensive, more thermally conductive ceramic fiber material.

It is therefore an object of the present invention to provide a refractory shape suitable for insulating water-cooled pipes in a metallurgical furnace which is made of a light-weight ceramic fiber material having an overall low coefficient of thermal conductivity.

Still another object of the present invention is to provide a refractory shape of low thermal conductivity which substantially reduces the energy expended in the manufacture of the refractory as well as the energy lost through the water-cooled pipes comprising the pipe network in the metallurgical furnace.

Another object of the present invention is to provide interlocking ceramic fiber refractory shape which reduces the necessary labor expenditure to mount the refractory shape.

A further object of the present invention is to provide a ceramic fiber refractory easily formed by means of a perforated vacuum mold.

Yet another object of the present invention is to provide a low-density, interlocking, vacuum-formed composite ceramic fiber refractory in which the stresses in the interlock area are significantly reduced thereby reducing the failure in the interlock area due to fracture and fatigue.

An even further object of the present invention is to provide a low-density, ceramic fiber refractory in which the crushing forces of the refractory upon a fiber blanket positioned between the pipe and the refractory are substantially reduced.

Another object of the present invention is to provide a low-density, vacuum-formed ceramic fiber refractory which is positioned around a water pipe without the use of anchoring devices such as metal studs welded to the pipe.

These and other objects and advantages of the present invention will become apparent when read in light of the drawings, specification and claims herebelow.

DESCRIPTION OF THE PREFERRED EMBODIMENT

Structure

Figure 1:
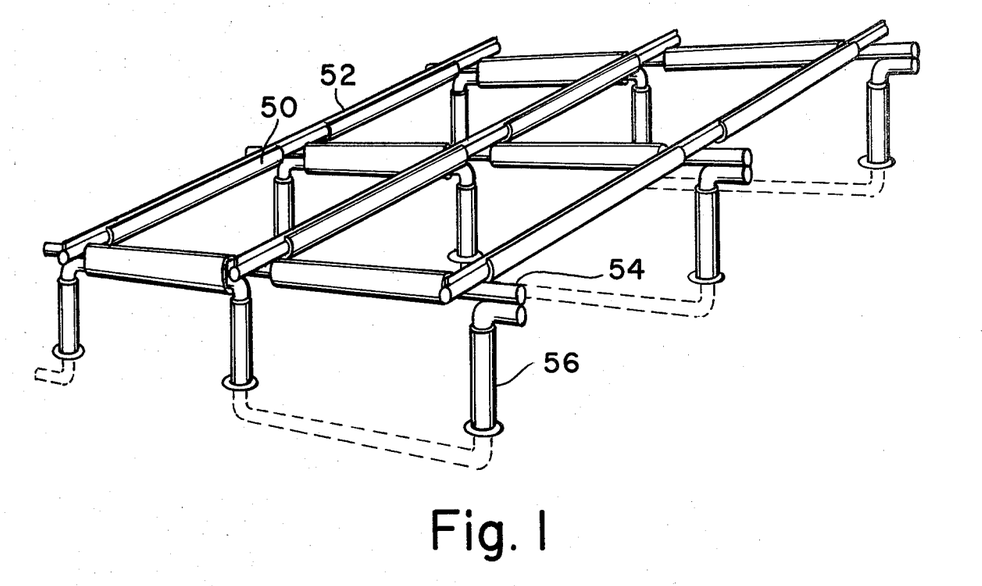
FIG. 1 is a perspective view of a typical water-cooled pipe network utilized in a metallurgical furnace.
Figure 2:
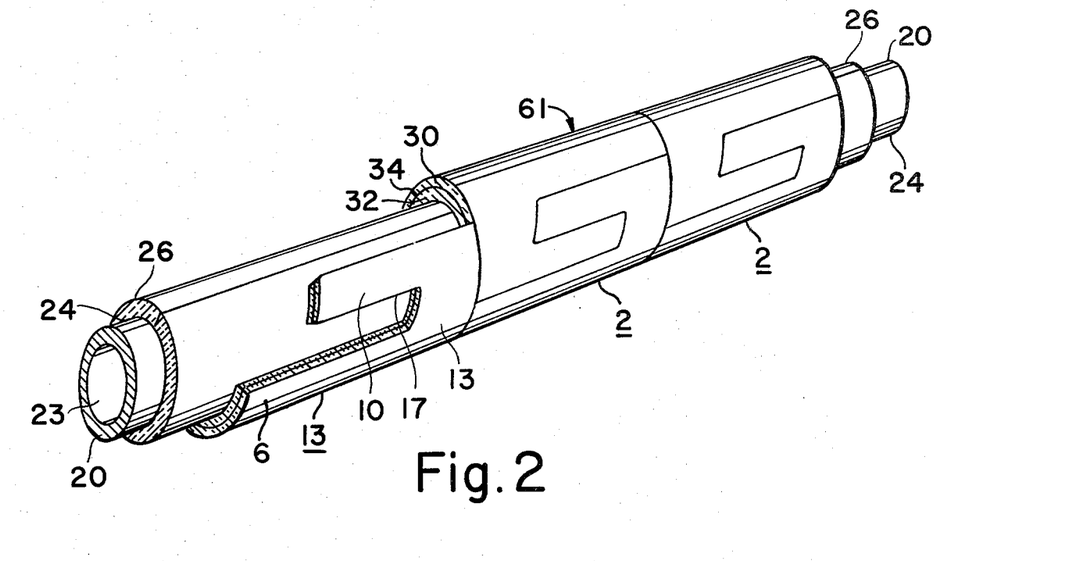
FIG. 2 is a perspective view of the present invention showing a water-cooled pipe, a ceramic fiber blanket therearound, and the surrounding interlocking engagement of the main segments of the refractory shape.

FIG. 1 diagrammatically shows a pusher type metallurgical furnace having a series of parallel skid rails 50 each having a metal strip 52 which supports the slab shape as the shape is propelled across the skid rail system. Horizontal support pipes 54 and vertical support pipes 56 as well as the water-cooled skid rail 50 all conduct flowing water. The heat which is transferred from the interior of the furnace into the metal strip 52 is then conducted by the water flowing in the water-cooled portion of the skid rail 50 and the horizontal pipes 54 and vertical pipes 56, which form the infrastructure support system for the skid rails, to a point outside the furnace system. FIG. 2 shows a partially exploded view of a water-cooled pipe having two full units of the refractory 2 and a main segment 13 in position around the pipe 20 having a cylindrical passageway 23 therethrough suitable for transporting a fluid therein. Located around the exterior surface 24 of the water-cooled pipe 20 is a layer of a conventional high-temperature pliable ceramic fiber blanket 26 which is known today in the industry. By way of example and not by way of limitation, the ceramic fiber blanket is preferably one-quarter inch to one inch thick and is taped temporarily around the pipe until such time as the refractory 2 is applied therearound. Each main segment 13 of the refractory 2 includes an inner ceramic fiber layer 32, an outer ceramic fiber layer 30 and a metal mesh reinforcement 34 disposed therebetween. Those skilled in the art will realize that the outer ceramic fiber layer 30 and the inner ceramic fiber layer 32 can be of an identical material. For pupuses of economy, however, the inner layer 32 of the present invention can be less resistant to furnace temperatures and attack by slag and furnace gases than the outer layer 30. Hence, because the inner layer 32 is less expensive to manufacture than is the outer layer 30, the refractory 2 can be manufactured at reduced cost. Each ceramic fiber layer contains proportions of a 2300° F. ceramic fiber bulk, a 2600° F. ceramic bulk and/or a 3000° F. ceramic fiber bulk. The precise ratios of one fiber bulk to another is a result of the furnace temperatures encountered, the allowable or desired thickness of the refractory and the permitted cost of manufacture. One acceptable 2300° F. basic fiber bulk, which is manufactured by the Babcock & Wilcox Company, consists primarily of fibers having a 47.0% $Al_2O_3$ and 52.9% $SiO_2$ percent by weight composition. A 2600° F. bulk ceramic fiber product is also manufactured by the same company having a 55.0 to 44.9% by molecular weight composition of $Al_2O_3$ and $SiO_2$ respectively. An even more temperature resistant and low thermally conductive 3000° F. ceramic fiber bulk is manufactured by the Imperial Chemical Industries Ltd. having a 95.0% and 5.0% by molecular weight of $Al_2O_3$ and $SiO_2$ respectively. By way of example and not by way of limitation, the inner layer can be formed from a slurry having the following relative weights: 2300° F. ceramic fiber bulk—8 lbs.

3000° F. ceramic fiber bulk—2 lbs.
colloidal silica—1.8 lbs.
starch—0.75 lbs.
water—585 lbs.

A preferable colloidal silica is manufactured by E. I. du Pont de Nemours & Co. under the trademark "LUDOX HS-40." A suitable starch for the slurry is described in U.S. Pat. No. 3,224,927. A colloidal alumina may be substituted for the colloidal silica in the appropriate molecular weight. The purpose of the starch is to maintain the silica binder in a colloidal state, during the forming operation. The starch which is organic is burned out during the subsequent curing operation leaving a substantially inorganic bond.

A suitable slurry for the formation of the outer ceramic fiber layer 30 is, by way of example and not by limitation, formed according to the following:
2300° F. ceramic fiber bulk—4 lbs.
3000° F. ceramic fiber bulk—6 lbs.
colloidal silica—1.8 lbs.
starch—0.75 lbs.
water—585 lbs.

According to the above-noted disclosure and description, the higher the content of the alumina ($AL_2O_3$) the more resistant to temperature, slags and furnace gases is the resulting ceramic fiber.

The metal mesh reinforcement 34 which is disposed between the inner layer 32 and the outer 30 of the refractory 2 can be any material which substantially maintains its rigidity and reinforcement characteristics in continuous operating temperatures which occur at a predetermined point of depth in the thickness of the refractory. According to the present invention, the inside furnace temperature is approximately 2400°-2500° F. and the metal mesh reinforcement is disposed at a depth in the refractory 2 wherein the metal mesh 34 operates at a continuous temperature of approximately 1500° F. to 2000° F. For example, for a refractory having a ¾-inch thickness and having a metal mesh 34 approximately ⅜ of an inch from the outer surface 61 of the outer layer 30, the metal mesh experiences a continuous operating temperature in the neighborhood of 1500° F. The metal mesh can be a woven wire, having a construction similar to that found in a screen door, or an expanded metal mesh which is well known in the industry today. For purposes of the present invention, the metal mesh is preferably made from a group of chromium-nickel steels having standard American Iron & Steel Institute (AISI) numbers of 304, 309, 316, 310 and RA330. RA330 is the preferred alloy if cost is of little consideration. The 310 alloy is slightly less acceptable but more economical to use and retains a 3500 psi tensile strength at 2400° F. and has a continuous operating temperature of 2100° F. Although the metal mesh can assume many shapes and dimensions, the most suitable metal mesh has two to eight openings per inch and a strand size or thickness of 0.025 through 0.100 inches.

Another suitable mesh is a woven ceramic fiber mesh which is a woven braided or knitted fabric manufactured by the Three M Company from a yarn called 3M Brand Ceramic Fiber. The mesh has a use temperature limit of approximately 2300° F.

Figure 3:
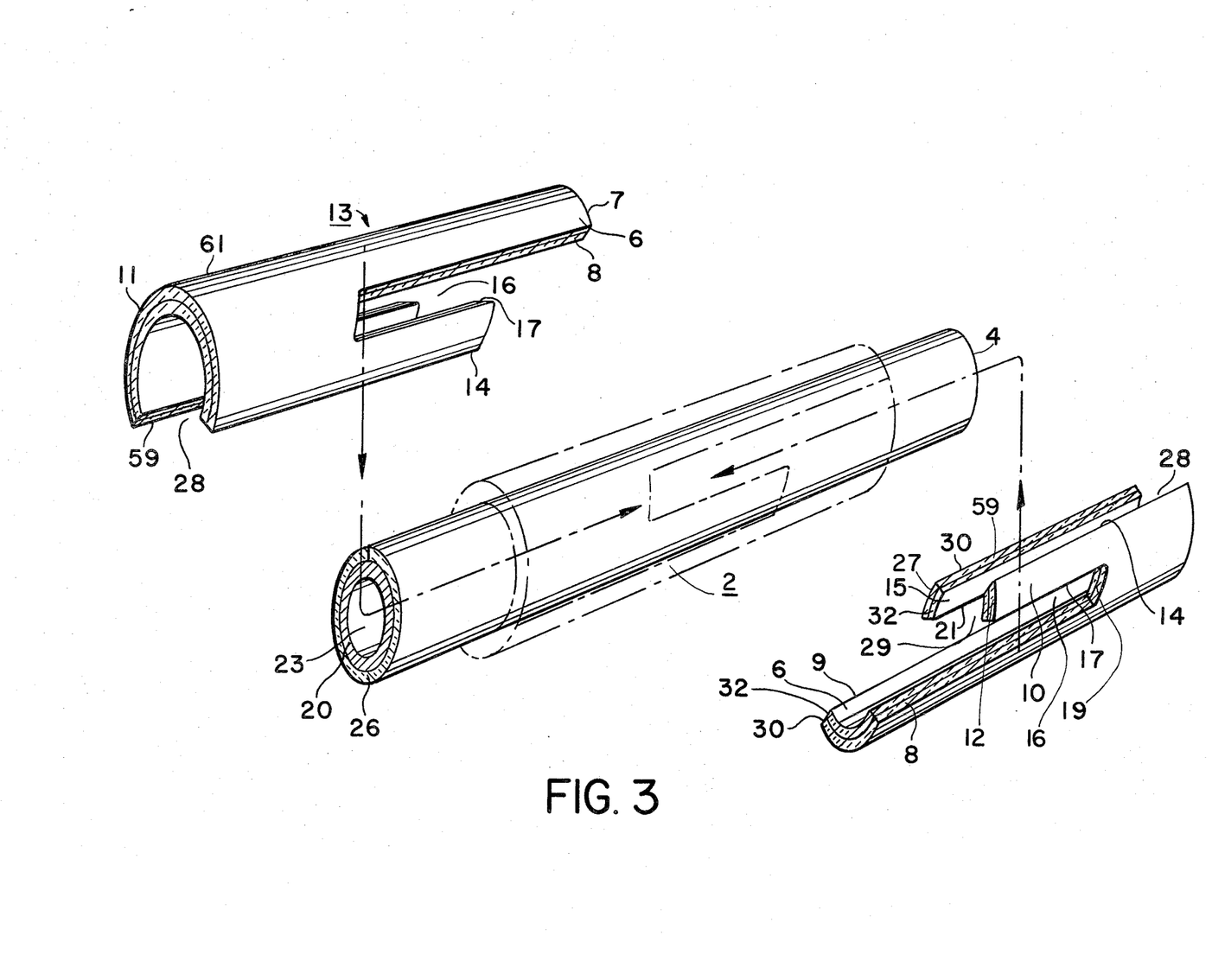
FIG. 3 shows an exploded view in perspective of the interlocking main segments of the refractory further showing the interlocking characteristics and method of interlocking the main segments.
Figure 4:
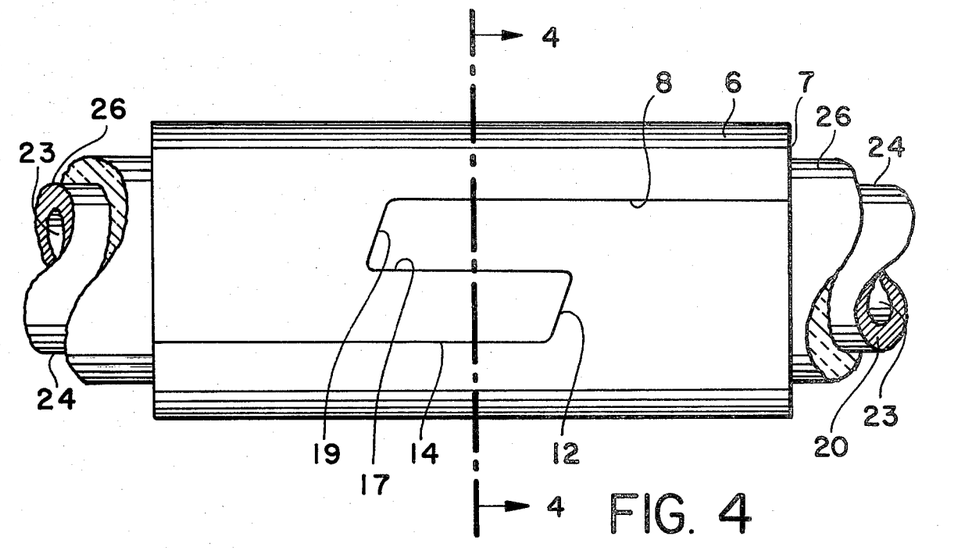
FIG. 4 is a side view of the present invention generally showing the seams defined by the protuberances, recesses, body segments and voids of two interlocked main segments.
Figure 6:
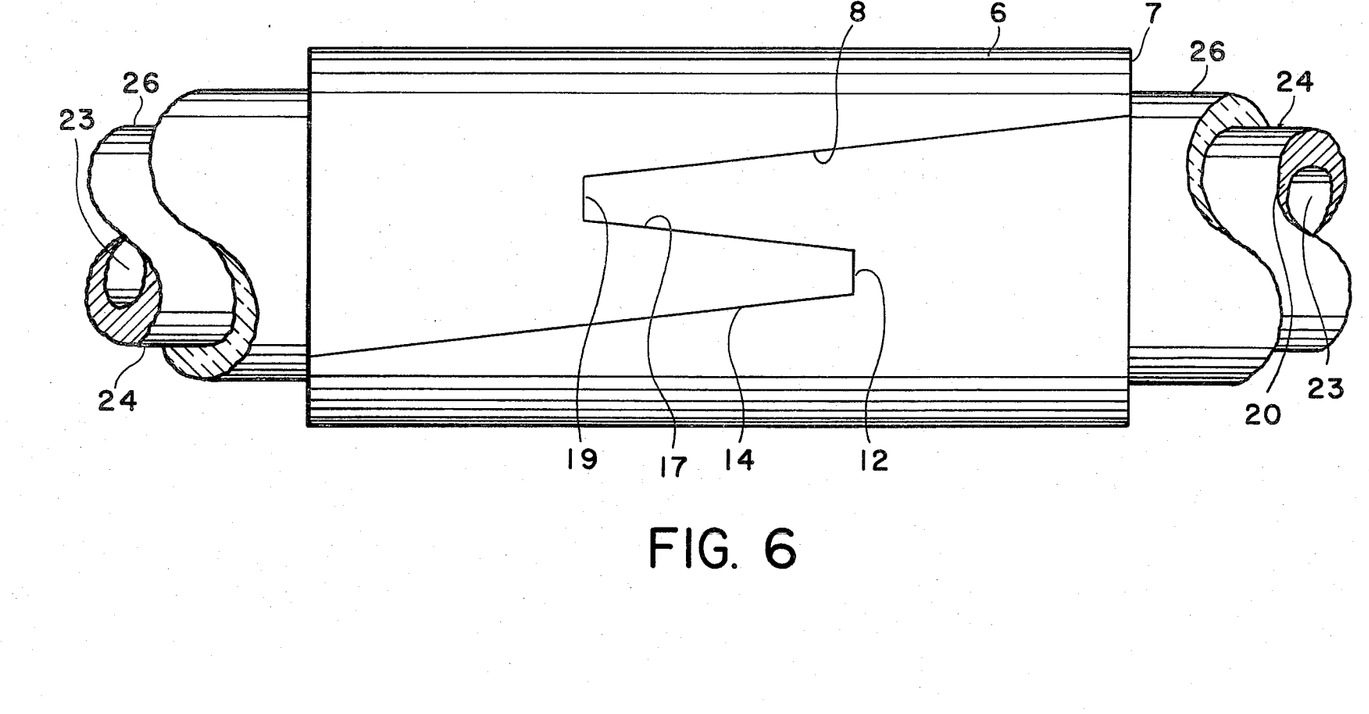
FIG. 6 is a side view of another embodiment of the present invention showing the seams defined by the tapered protuberances, the conformingly tapered recesses, the tapered body segments and the voids of the two interlocked main segments.

The refractory shape 2 includes two substantially identical main segments 13. Each main segment has a partial cylindrical body segment 6 having radially aligned edge surfaces 7 and 11. The body segment 6 is partially defined by a pair of longitudinally extending surfaces 8 and 9 which extend radially through the inner layer 32, outer layer 30 and metal mesh 34 and longitudinally less than the main segment 13. A pair of protuberances 10 and 15 are partially defined by the surfaces 12, 27 respectively, which are normal to the longitudinal axis of the main segment 13, and the radially aligned and longitudinally extending surfaces 17, 14 and 21, 59 respectively. The protuberances 10 and 15 are angularly spaced apart from the main body 6 by the recesses 16 and 29 which are generally defined by the surfaces 17 and 21, a portion of the surfaces 8 and 9, and the surface 19 and its counterpart (not shown), respectively, which are normally aligned to the longitudinal axis of the main segment 13. For each main segment 13, the body segment 6, the recesses 16 and 29, and the protuberances 10 and 15 lie within a common cylindrical surface of rotation. The protuberances 10 and 15 are further spaced apart from one another by a void 28. As partially shown in FIG. 6, the protuberances 10 and 15, and the body segment 6 of each main segment can have tapered surfaces 17, 14 and 21, 59, and 8, 9, respectively. The tapering of the surfaces of the protuberances and the body segments offers the additional feature of insuring a more intimate fit between the protuberances 10 and 15 as they are received within the recesses 16 and 29. The more intimate fit can be obtained by overinserting the two main segments 13 into an interlocking relationship and then cutting the end surfaces of the refractory 2 so that the end surfaces 7 of each main segment 13 are substantially aligned with the conforming surfaces 11 when the main segments 13 are interlocked.

The protuberances 10 and 15 of each main segment 13 conform closely to the corresponding recesses 16 and 29. The body segment 6 of each main segment 13 closely conforms to the void 28. Accordingly, when each main segment 13 is rotated around a longitudinal axis 180° from one another and further rotated 180° around a vertical axis and are aligned along a common longitudinal axis, the body segment 6 of one segment is closely received by the void 28 of the other segment, and the protuberances 10 and 15 are likewise closely received by the recesses 16 and 29 of the other main segment such that a substantially cylindrical, interlocking refractory 2 results. The seams which are defined by the interlocking portions of the refractory 2 are substantially closed and resistant to the entry of slag and high-velocity convection which occurs within a metallurgical furnace. In the preferred embodiment, the water-cooled pipe is first wrapped with a one-quarter inch through one inch thick layer of a high-temperature, pliable ceramic fiber blanket 26 which is taped around the pipe 20. A first main segment 13 of the refractory 2 is positioned upon the surface of the water-cooled pipe 20 wrapped with the ceramic fiber blanket 26. The other main segment 13 of the interlocking refractory 2 is properly oriented to facilitate the longitudinal engagement of the interlocking protuberances 10 and 15 with the recesses 16 and 29. The two interlocking main segments 13 are then urged radially inwardly in order to compress the pliable ceramic fiber blanket and then pushed longitudinally toward one another in order to effectuate the interlock and to minimize the seams between the two interlocking main segments 13. Repetition of the above-noted procedure is continued until the desired length of refractory covers the water-cooled pipe 20. As junctions between horizontal and vertical pipes are reached, reduced lengths of the refractory 2 can be used in order to minimize the remaining exposed segments of the water pipe 20. Any conventional wrapping or suitable refractory cement can be used in the immediate area of the intersections.

Figure 7:
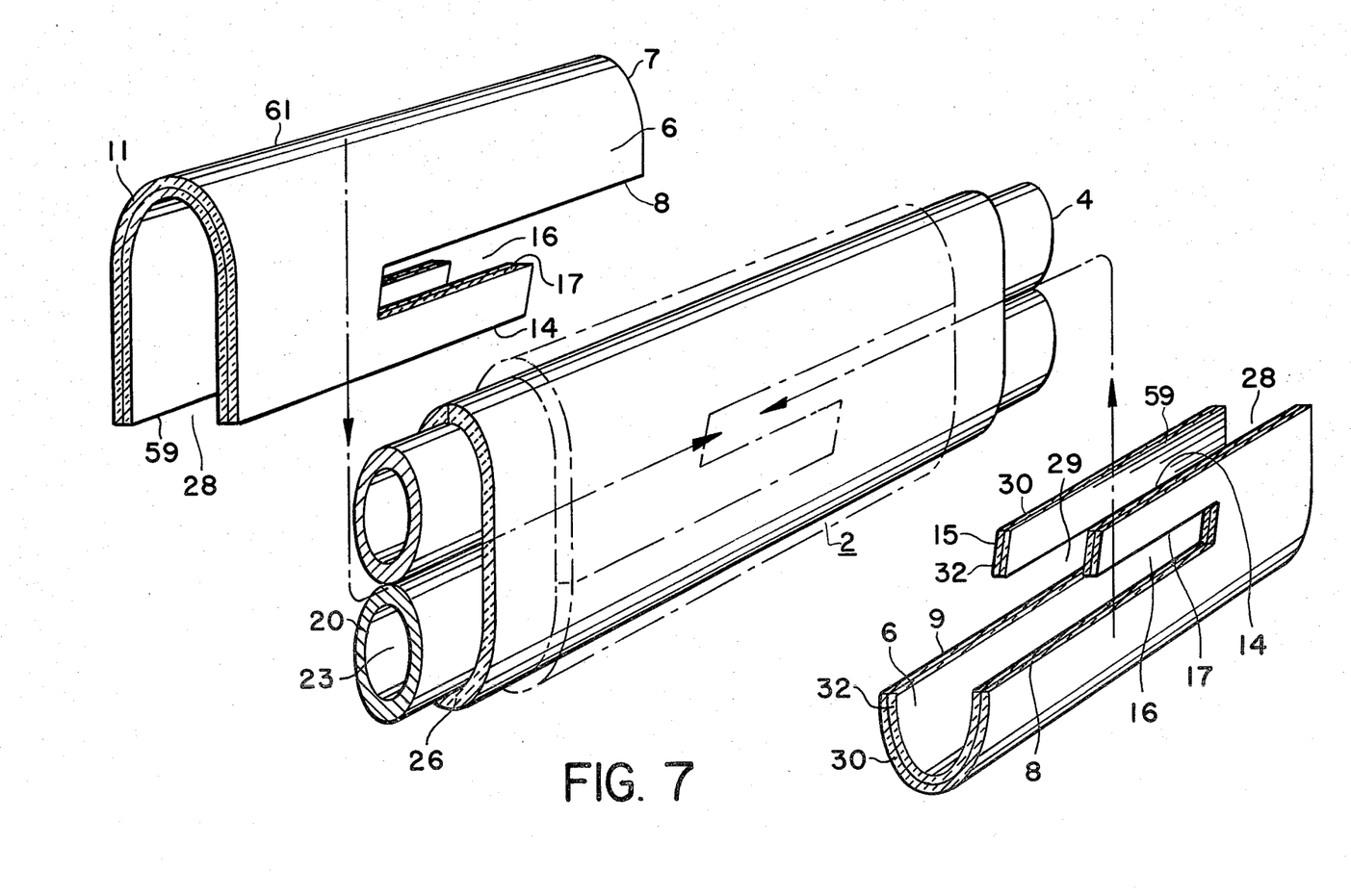
FIG. 7 is an exploded view in perspective showing another embodiment of the present invention in which two parallel pipes are insulated with a substantially elliptical refractory.

Because of the construction of the pipe structure within a metallugical furnace, there are areas in which two independent and aligned pipes are in proximity to one another. A slight modification to the basically cylindrical construction of the present invention as shown in FIG. 7 will suffice in the insulation of these pipes. The basic cylindrical shape is modified to a more elliptical shape such that the pair of parallel pipes can be wrapped in a ceramic fiber blanket and then encapsulated with the more elongated ceramic fiber refractory. It is understood that several numbers and arrangements of pipes can be insulated according to the present invention with an appropriately vacuum-molded ceramic fiber refractory.

Those skilled in the art will realize that the application of a suitable high-temperature slurry coating material such as air or heat-setting mortar to the outer surface 61 of the outer layer 30 will enhance the slag resistance of the refractory 2. By way of example, and not by way of limitation, one such surface coating is manufactured by Babcock & Wilcox Company according to the approximate chemical analysis:

| | |
|---|---|
| $SiO_2$ | 53.0% |
| $Al_2O_3$ | 45.0% |
| $Na_2O$ | .8% |
| $Fe_2O_3$ | .6% |
| CaO/MgO | .4% |
| trace inorganics | .2% |

The resulting compound is a self-curing high temperature protective coating providing an additional degree of surface hardness, resistance to slag penetration, and resistance to erosion of the ceramic fiber. Another coating which is self curing contains 95% $ZrO_2$ which can also be applied cold.

METHOD OF MANUFACTURE

Figure 5:
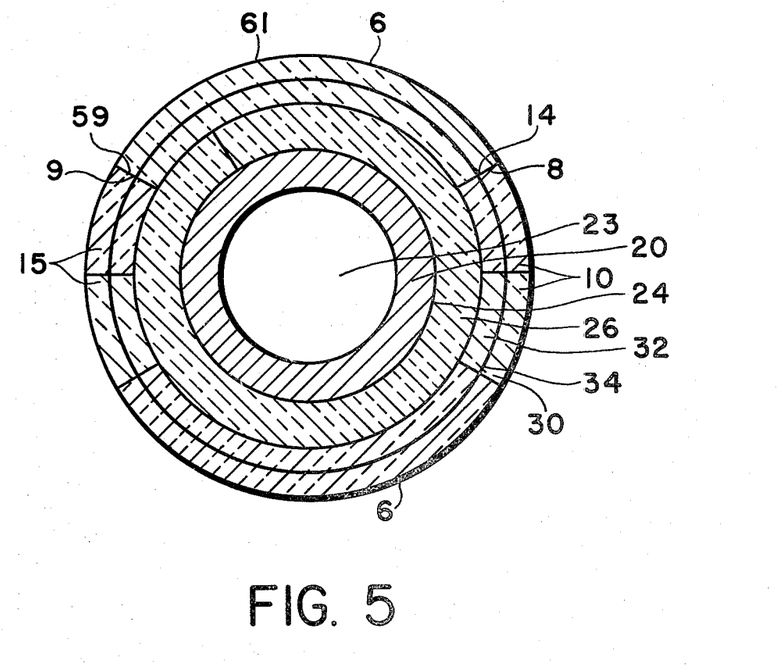
FIG. 5 is a cross-section along lines 4—4 generally showing the radial relationship among the pipe, ceramic fiber blanket, inner ceramic fiber layer, metal mesh and outer ceramic fiber layer.

Although relatively new, the procedure for vacuum-forming ceramic fiber shapes is known in the industry. According to the present invention, a first slurry containing, for example, the ceramic fibers the colloidal silica, organic cationic starch and water is formed in accordance with the amounts noted heretofor. For best results, the slurry is agitated or stirred in order to assist in the maintenance of the colloidal state within the slurry. A perforated cylindrical male mold (not shown) whose perforations are in communication with a partial vacuum source, is inserted into the slurry. The colloidal silica medium, the starch and the water within the slurry are drawn through the perforations by the vacuum effect. The ceramic fibers, however, are significantly long and generally do not pass through the perforations of the mold. Hence, the ceramic fibers tend to form a mat around the perforated vacuum mold. The mat around the perforated vacuum mold is more dense when nearest the mold and is less dense as it is formed radially outwardly and away from the mold. By varying the amount of vacuum applied to the perforations of the mold, the density, and to some degree the rigidity, of the mat can be varied. When the desired thickness of the inner ceramic fiber layer has been deposited on the perforated vacuum mold in the first slurry, the mold is removed from the slurry. The inner surface of the inner layer 32, being closest to the vacuum source, exhibits a textured screen-like appearance. The outer surface of the inner layer 32, being farther from the vacuum source, is rougher in appearance and is called the bark surface. The bark surface can be, but is not necessarily required to be, smooth before superimposing the metal mesh 34 therearound. The mesh can be prepositioned in the mold prior to the forming of the first layer, the first layer formed to a point where it is built up to the mesh and then placed in the second slurry for forming of the final layer. The combination of the perforated vacuum mold, inner layer 32 and superimposed metal mesh 34 is then inserted into a second slurry such as, for example, a second slurry described hereinabove. Because the inner layer 32 is sufficiently porous, the vacuum-like effect communicates through the perforations in the vacuum mold, through the metal mesh and into the second slurry. Hence, a ceramic fiber mat is developed around the metal mesh 34 until such time as the desired thickness occurs. The perforated vacuum mold is then withdrawn from the second slurry leaving an outer ceramic fiber layer 30 deposited around the metal mesh 34. The perforated vacuum mold is then removed from the combination of the inner ceramic fiber layer 32, the metal mesh 34 and the outer ceramic fiber layer 30 which substantially comprises the refractory shape 2. The refractory 2 is then positioned on a suitable mandrel shape (not shown) and cured. The refractory 2 is cured in a temperature range of approximately 180° F. through 500° F. for a period of four through eight hours. Forced convection in the curing oven will minimize the curing time.

The new combination of a laminated ceramic fiber refractory not only saves energy by reducing the heat loss within a metallurgical furnace, but also substantially reduces the energy requirement to cure the refractory itself. For example, dense prefired ceramic refractories have generally required curing at a temperature of 2700° F. Approximately sixteen hours are required to fire a furnace to 2700° F. The conventional preburned ceramic refractories have then been cured at 2700° F. for six to eight hours. The furnace has then slowly been cooled from 2700° F. to ambient temperature and the fired refractories have then been removed from the furnace. The total time involved has been thirty to forty hours and the energy required to produce the requisite temperatures has been immense. Conversely, the manufacture of the new interlocking, laminated vacuum-formed ceramic fiber refractory requires an average of only six hours in a continuous oven process at a temperature of 180° through 500° F. Hence, the energy saving during the manufacturing process of the refractory itself is substantial.

The outside or bark surface of the outer layer 30 is preferably, but not necessarily, smoothed to a desired texture. The cured refractory is most preferably cut at both ends along planes normal to the longitudinal axis of the refractory 2 so that a true cylinder is formed. Even though the refractory 2 can be achieved by the independent formation of two substantially identical main segments 13, the more efficient procedure is to manufacture a composite, laminated refractory 2 and then divide the refractory 2 by any suitable means into two substantially identical main segments 13.

In the preferred embodiment, the void 28 is sufficiently large to receive a longitudinally aligned pipe 20. Most preferably, the void 28 and the body segment 6 occupy approximately 120° of cylindrical displacement. A preferred thickness of the inner layer 32 is one-eighth inch through one-half inch. The preferred thickness of the outer layer 30 is preferably one-eighth through one-half inch. It is realized that the longer the interlock portion of the refractory 2, that is those portions of the refractory generally defined by the interlocking recesses 16, 29 and protuberances 10 and 15 of each main segment 13, the more effective is the resulting interlocking action, stability of the refractory 2 around the blanket 26 and pipe 20 and the smaller are the seams which result when the two main segments 13 are interlocked. The tapering of the protuberances and conforming recesses further reduces penetration through the seams by the slag and corrosive gases. Because of the remarkably improved weight characteristics of the new interlocking, laminated vacuum-formed ceramic fiber refractory, the weight per lineal foot has been reduced to two to three pounds as opposed to the thirty-five to forty pounds per lineal foot for the conventional prefired ceramic refractory tile. Hence, the weight and stress placed upon the water-cooled infrastructure is significantly reduced, and the loads and stresses on the protuberances 10 and 15 are reduced thereby reducing in turn the fractures and failures in those areas. Moreover, the reduced weight per lineal foot of the present invention substantially reduces the crushing effect of the refractory 2 on the blanket 26 when the blanket is maintained in compression inside the refractory 2.

It is understood by those skilled in the art that the present invention is suitable for application as a process pipe insulation such as those insulations used in the petroleum or utility industry. Moreover, when a thermal gradient is inverted such that the fluid inside the pipe is at a higher temperature than the surrounding atmosphere, it may be more efficient to invert the layers of the refractory wherein the inner layer is more suitable for high temperature environment than is the outer layer.

The resulting new and improved refractory greatly reduces heat loss through water-cooled pipes in a metallurgical furnace. For example, in a furnace operating between 2400° F. and 2500° F., the approximate following heat losses occur:

|  | Btu/lineal foot/hour |
| --- | --- |
| bare pipe | 117,500 |

It is clear, therefore, that the new and useful invention of an interlocking, laminated, reinforced vacuum-formed ceramic fiber refractory fulfills the objects and advantages of the present invention as well as others which are abundantly clear in light of the claims. For purposes of the disclosure, a preferred embodiment has been described and claimed. It is understood, however, that other substantial equivalents, adaptations, modifications and combinations of the present invention directly fall within both the spirit and the scope of the specification, drawings and claims herein.

What is claimed is:

1. A laminated cylindrical refractory produced by forming a first slurry of ceramic fibers, water and a binder, submerging a perforated cylindrical mold into the slurry, the perforations of said mold in communication with a partial vacuum source which tends to draw the slurry toward the perforated vacuum mold;

permitting the ceramic fibers of the first slurry to be deposited as a substantially cylindrical inner ceramic fiber layer upon the exterior of the perforated mold;

withdrawing the perforated mold and the deposited inner layer from the slurry when a desired thickness of the inner layer has been deposited upon the perforated mold;

superimposing a mesh reinforcement around the inner layer;

forming a second slurry of ceramic fibers, water and a binder, the fibers in said slurry being more resistant to slag attack, high temperature and corrosive gases than the fibers in the first slurry;

submerging the perforated mold, inner layer and superimposed mesh into the second slurry and communicating a partial vacuum through the mold perforations and through the inner layer such that an amount of the second slurry is drawn toward the inner layer and the metal mesh;

permitting an amount of the ceramic fibers in the second slurry to be deposited on the mesh and the inner layer as outer ceramic fiber layer;

withdrawing the perforated mold, inner layer, mesh and outer layer from the second slurry;

removing the perforated mold from the inner layer, mesh and outer layer, thereby leaving a substantially cylindrical, laminated refractory;

curing the laminated refractory until the desired rigidity is achieved;

forming substantially radial edge surfaces at each end of the cylindrical laminated refractory;

severing the cylinder along substantially radial surfaces into two substantially identical first and second main segments, whereby each main segment forms:

(a) a body segment partially defined by first and second radially aligned surfaces extending longitudinally less than the length of the cylindrical, laminated refractory, (b) first and second protuberances in proximity to and spaced apart angularly from the first and second radially aligned surfaces respectively, said protuberances extending longitudinally less than the body segment and angularly spaced apart from each other by a void, and (c) first and a second recesses bounded longitudinally by the first radially aligned surface and the first protuberance and the second radially aligned surface and the second protuberance respectively, wherein the body segment, first and second protuberances and the first and second recesses for each main segment are positioned on a common cylindrical radius such that when the first and second main segments are axially aligned and urged longitudinally together, the first body segment and the second body segment occupy the void of the second main segment and the first main segment respectively, the first and the second protuberances on the first main segment are closely received by the first and second recesses respectively of the second main segment, and the first and second protuberances of the second main segment are closely received by the first and second recesses respectively of the first main segment, thereby forming an interlocking, laminated refractory of substantially the same cylindrical shape of the refractory as removed from the perforated mold.

2. The device of claim 1 wherein the protuberances and body segments are tapered thereby tapering the recesses correspondingly such that when a pair of main segments are interlocked and the main segments are longitudinally urged toward one another, the opposing main segments form a more intimate interlock.

3. The device of claim 2 wherein the main segments, when interlockingly engaged with one another, form an elliptical-like vacuum-molded ceramic fiber refractory suitable for insulating a plurality of parallel pipes therein.

* * * * *